(12) United States Patent
Chen et al.

(10) Patent No.: US 9,426,673 B2
(45) Date of Patent: Aug. 23, 2016

(54) VIRTUAL CELL MANAGEMENT FOR INTERFERENCE SUPPRESSION AND INTERFERENCE CANCELLATION IN LTE

(71) Applicant: QUALCOMM Incorporated, San Diego, CA (US)

(72) Inventors: Wanshi Chen, San Diego, CA (US); Tao Luo, San Diego, CA (US); Peter Gaal, San Diego, CA (US); Hao Xu, San Diego, CA (US); Taesang Yoo, San Diego, CA (US); Durga Prasad Malladi, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 13/953,531

(22) Filed: Jul. 29, 2013

(65) Prior Publication Data

US 2014/0302863 A1    Oct. 9, 2014

Related U.S. Application Data

(60) Provisional application No. 61/809,122, filed on Apr. 5, 2013.

(51) Int. Cl.
*H04W 24/02* (2009.01)
*H04W 16/00* (2009.01)
*H04W 28/18* (2009.01)

(52) U.S. Cl.
CPC ............ *H04W 24/02* (2013.01); *H04W 16/00* (2013.01); *H04W 28/18* (2013.01)

(58) Field of Classification Search
CPC .... H04W 24/02; H04W 16/00; H04W 28/18
See application file for complete search history.

(56) References Cited

U.S. PATENT DOCUMENTS

| 7,155,229 | B2 | 12/2006 | Dent |
| 8,467,339 | B2 | 6/2013 | She et al. |
| 2011/0287777 | A1* | 11/2011 | Yu .............................. 455/452.1 |
| 2012/0182951 | A1 | 7/2012 | Okubo et al. |
| 2013/0083729 | A1 | 4/2013 | Xu et al. |

(Continued)

OTHER PUBLICATIONS

Kwon S., et al., "Cell ID extension in femtocell environments," Computer Networks, 2013, vol. 57, pp. 1048-1062.

(Continued)

*Primary Examiner* — Habte Mered
(74) *Attorney, Agent, or Firm* — Norton Rose Fulbright US LLP

(57) ABSTRACT

In some aspects, a method for performing wireless communication includes configuring a set of virtual cells for user equipments (UEs). One or more virtual cells of the set is associated with at least one set of parameters. The method also includes transmitting information, to the UEs, regarding the set of the virtual cells, and operating, for a same virtual cell, according to a same set of parameters for some or all of the UEs. In other aspects, a method for performing wireless communications includes receiving, from a node, information regarding, for a UE, a set of virtual cells associated with a set of parameters. The method also includes communicating with the node. The communication is based on a virtual cell and its associated set of parameters.

64 Claims, 5 Drawing Sheets

(56) References Cited

U.S. PATENT DOCUMENTS

| | | | |
|---|---|---|---|
| 2013/0225189 A1* | 8/2013 | Moon | H04W 72/042 455/452.1 |
| 2013/0235821 A1 | 9/2013 | Chen et al. | |
| 2013/0294368 A1* | 11/2013 | Bendlin et al. | 370/329 |
| 2013/0301561 A1* | 11/2013 | Sartori et al. | 370/329 |
| 2014/0198747 A1* | 7/2014 | Ouchi | H04L 5/0053 370/329 |
| 2014/0222402 A1* | 8/2014 | Langeveld | G01V 5/0016 703/2 |
| 2014/0233466 A1 | 8/2014 | Pourahmadi et al. | |
| 2014/0376482 A1* | 12/2014 | Kim et al. | 370/329 |
| 2015/0003388 A1* | 1/2015 | Mazzarese et al. | 370/329 |
| 2015/0222402 A1* | 8/2015 | Ouchi | H04L 1/00 370/329 |
| 2015/0296513 A1* | 10/2015 | Nogami | H04W 28/18 370/329 |

OTHER PUBLICATIONS

Ericsson et al., "Details on UL DMRS", 3GPP Draft; R1-120882 UL DMRS, 3rdgeneration Partnership Project (3GPP),Mobile Competence Centre ; 650, Route Deslucioles, F-06921 Sophia-Antipolis Cedex, France,vol. RAN WG1, No. Dresden, Germany, 20120206-29120210, Feb. 13, 2012, XP050563371, pp. 1-6.

International Search Report and Written Opinion—PCT/US2014/016497—ISA/EPO—Jul. 1, 2014.

Qualcom Incorporated: 'Downlink control signaling in support of downlink CoMP, GPP Draft; R1-123691 Downlink Control Signaling in Support of Downlink Comp, 3rd Generation Partnership Project (3GPP), Mobile Competence Centre ; 650, Route Des Lucioles ; F-06921 Sophia-Antipolis C vol. RAN WG1, No. Qingdao, China; 20120813-20120817 Aug. 5, 2012, XP050661565, Retrieved from the Internet: UPL:http://www.3gpp.org/ftp/tsg_ran/WG1_RL1/TSGR1 70/Docs/.

* cited by examiner

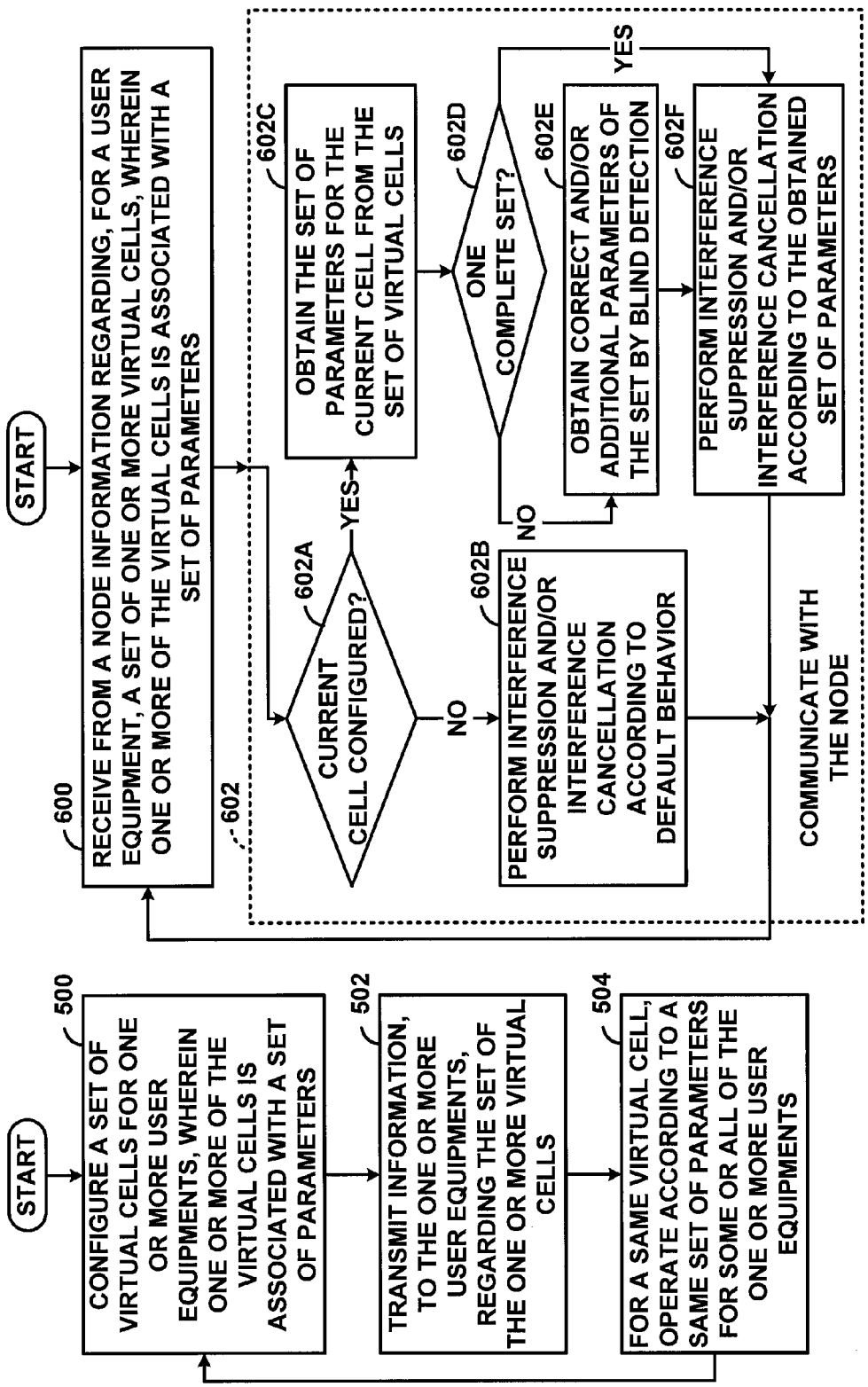

VIRTUAL CELL MANAGEMENT FOR INTERFERENCE SUPPRESSION AND INTERFERENCE CANCELLATION IN LTE

CROSS-REFERENCE TO RELATED APPLICATIONS

This application claims the benefit of U.S. Provisional Patent Application No. 61/809,122, entitled, "VIRTUAL CELL MANAGEMENT FOR INTERFERENCE SUPPRESSION AND INTERFERENCE CANCELLATION IN LTE", filed on Apr. 5, 2013, which is expressly incorporated by reference herein in its entirety.

BACKGROUND

1. Field

Aspects of the present disclosure relate generally to wireless communication systems, and more particularly, to virtual cell management for interference suppression and interference cancellation in LTE.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

Evolved NodeBs (eNBs) of a network may be pooled together as virtual cells so that they can be treated as one large resource by network managers and users alike. Each virtual cell may include a group of physical cells that may jointly serve a UE. A virtual cell may include a set of macro cells, a macro cell and a relay, etc.

4G LTE Advanced coordinated multipoint (CoMP) systems may be used to send and receive data to and from a UE coordinated by several points to ensure the optimum performance is achieved even at cell edges. LTE CoMP is essentially a range of different techniques that enable the dynamic coordination of transmission and reception over a variety of different base stations. The aim is to improve overall quality for the user as well as improving the utilization of the network. Essentially, LTE Advanced CoMP turns the inter-cell interference (ICI) into a useful signal, especially at the cell borders where performance may be degraded.

CoMP may have a plurality of transmission modes, e.g., Joint Processing (JP) mode, dynamic point selection (DPS), joint reception, Coordinated Scheduling/Beamforming (CS/CB) mode, etc. In JP mode, the downlink data for a mobile device may be transmitted from several locations simultaneously (Joint Transmission). A simpler alternative is DPS, in which data is available at several locations, but the data is generally sent from one location at any one time. In CS/CB mode, the downlink data for a mobile device is typically available and transmitted from one point. The scheduling and optional beamforming decisions are generally made among all cells in the CoMP set. Locations from which the transmission is performed can be changed semi-statically.

CoMP may generally have four different deployment scenarios: homogeneous network intra-eNB CoMP (Scenario 1); homogeneous inter-eNB CoMP (Scenario 2); heterogeneous network in which eNBs are configured with different physical cell identities (PCIs) (Scenario 3); and heterogeneous network in which eNBs are configured with the same PCI (Scenario 4). Scenario 1 and Scenario 2 are both for homogeneous networks, and differ in whether optical fiber is deployed between physical nodes for back-channel communications. In Scenario 2, the optical fiber permits an eNB to operate remote radio heads (RRH) for CoMP over a larger area. Scenario 3 and Scenario 4 are both for heterogeneous networks but also differ in that, in Scenario 4, low power transmitters in the area of a macro cell are allowed to share a same physical cell identity as the macro cell.

In Scenario 1, a single eNB base station site may be comprised of three or more cells, each being responsible for a sector. In this scenario the eNB may control each of the three or more cell schedulers. In this way, it is possible to schedule a joint transmission by several cells of the eNB or to blank out the resource blocks in one cell that are used in another cell for a subscriber located in the area between two cells to reduce interference. This CoMP approach is easy to implement as no external communication to other entities is required. However, this CoMP approach lacks coordination with other eNBs. As a result, data rates for mobile devices that are located between two cells of two different eNBs may not be improved.

In Scenario 2, two or more RRHs may be distributed over an area and be connected to a single eNB over fiber optic links. These fiber optic links may transport a fully generated RF signal that the RRH converts from an optical signal into an electromagnetic signal that is then transmitted over the antenna. While this CoMP approach can coordinate transmission points in a much larger area than the first approach, its practical implementation may be more difficult as a fiber infrastructure must be put in place to connect the RRHs with the central eNB. A traditional copper wire-based infrastructure may be insufficient for this purpose due to the very high data rates required by the RF signal, the low latency requirement for coordination among the nodes, and the length of the cabling.

In Scenarios 3 and 4 another CoMP approach utilizes several low power transmitters in the area of a macro cell to cover hotspots, such as parts of buildings and different locations in shopping malls. This approach achieves general coverage via a macro cell and offloads localized traffic via local transmitters with a very limited range, thus, reducing the interference elsewhere. The implementation can be performed in two ways. The localized transmissions may have their own cell IDs and, thus, act as independent cells from a mobile device point of view. From a network point of view, however, those cells are similar to RRHs with a lower power output instead of a high power output as in Scenario 2. Another option may use RRHs, as defined above, with a low power output, but without a separate cell ID. In this case, the local signal becomes indistinguishable from the macrocell coverage for the mobile device. Again, fiber optical cabling is required to connect the low powered transmitter to a central eNB.

Interference suppression and interference cancellation may be performed by UEs as measures to improve communications. Many techniques for interference suppression and interference cancellation have been developed and implemented in various ways. In general, interference suppression and interference cancellation need to consider intra-cell and inter-cell interference, homogeneous and heterogeneous networks, control and data channels, and a wide range of signal to interference plus noise ratio (SINR) values. However, the introduction of CoMP introduces a set of features that is generally unfriendly for interference suppression and interference cancellation.

SUMMARY

In some aspects, a method for performing wireless communication includes configuring a set of one or more virtual cells for one or more user equipments (UEs), wherein one or more virtual cells of the set is associated with at least one set of parameters. The method also includes transmitting information, to the UEs, regarding the set of the one or more virtual cells. The method further includes operating, for a same virtual cell of the set of one or more virtual cells, according to a same set of parameters for some or all of the one or more UEs.

In other aspects, a method for performing wireless communications includes receiving, from a node, information, for a user equipment (UE), regarding a set of one or more virtual cells, wherein one or more of the virtual cells is associated with a set of parameters. The method additionally includes communicating with the node, wherein the communication is based at least in part on at least one virtual cell among the one or more of the virtual cells and its associated set of parameters.

In additional aspects, an apparatus for performing wireless communication includes means for configuring a set of one or more virtual cells for one or more user equipments (UEs), wherein one or more virtual cells of the set is associated with at least one set of parameters. The apparatus additionally includes means for transmitting information, to the UEs, regarding the set of the one or more virtual cells. The apparatus also includes means for operating, for a same virtual cell of the set of one or more virtual cells, according to a same set of parameters for some or all of the one or more UEs.

In further aspects, an apparatus for performing wireless communications includes means for receiving, from a node, information, for a user equipment (UE), regarding a set of one or more virtual cells, wherein one or more of the virtual cells is associated with a set of parameters. The apparatus additionally includes means for communicating with the node, wherein the communication is based at least in part on at least one virtual cell among the one or more of the virtual cells and its associated set of parameters.

In other aspects, a computer program product includes a computer-readable medium. The computer-readable medium includes code for causing a computer to configure a set of one or more virtual cells for one or more user equipments (UEs), wherein one or more virtual cells of the set is associated with at least one set of parameters. The computer-readable medium additionally includes code for causing a computer to transmit information, to the UEs, regarding the set of the one or more virtual cells. The computer-readable medium also includes code for causing a computer to operate, for a same virtual cell of the set of one or more virtual cells, according to a same set of parameters for some or all of the one or more UEs.

In additional aspects, a computer program product includes a computer-readable medium. The computer-readable medium includes code for causing a computer to receive, from a node, information, for a user equipment (UE), regarding a set of one or more virtual cells, wherein one or more of the virtual cells is associated with a set of parameters. The computer-readable medium additionally includes code for causing a computer to communicate with the node, wherein the communication is based at least in part on at least one virtual cell among the one or more of the virtual cells and its associated set of parameters.

In further aspects, a base station to perform wireless communications includes at least one processor and a memory coupled to said at least one processor. The at least one processor is configured to configure a set of one or more virtual cells for one or more user equipments (UEs), wherein one or more virtual cells of the set is associated with at least one set of parameters. The at least one processor is additionally configured to transmit information, to the UEs, regarding the set of the one or more virtual cells. The at least one processor is also configured to operate, for a same virtual cell of the set of one or more virtual cells, according to a same set of parameters for some or all of the one or more UEs.

In other aspects, a user equipment to perform wireless communications includes at least one processor and a memory coupled to said at least one processor. The at least one processor is configured to receive, from a node, information, for a user equipment (UE), regarding a set of one or more virtual cells, wherein one or more of the virtual cells is associated with a set of parameters. The at least one processor is additionally configured to communicate with the node, wherein the communication is based at least in part on at least one virtual cell among the one or more of the virtual cells and its associated set of parameters.

Various aspects and features of the disclosure are described in further detail below.

BRIEF DESCRIPTION OF THE DRAWINGS

FIG. 5 is a block diagram illustrating example blocks of a process, for performing wireless communications by a base station; and FIG. 6 is a block diagram illustrating example blocks of a process for performing wireless communications by a UE.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
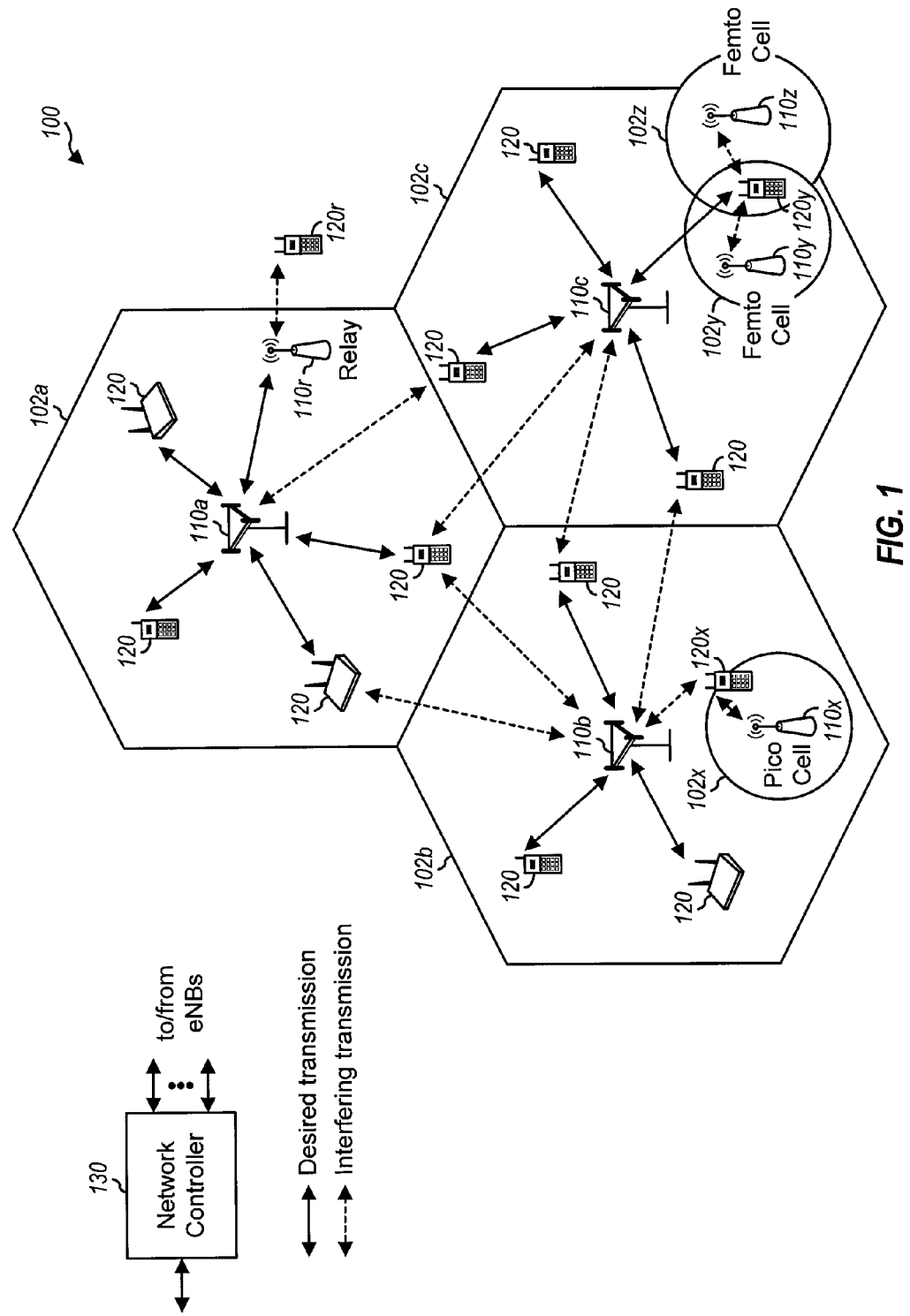
FIG. 1 is a block diagram conceptually illustrating an example of a telecommunications system.

FIG. 1 shows a wireless communication network 100, which may be an LTE network. The wireless network 100 may include a number of evolved Node Bs (eNodeBs) 110 and other network entities. An eNodeB may be a station that communicates with the UEs and may also be referred to as a base station, an access point, etc. A Node B is another example of a station that communicates with the UEs.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless network 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
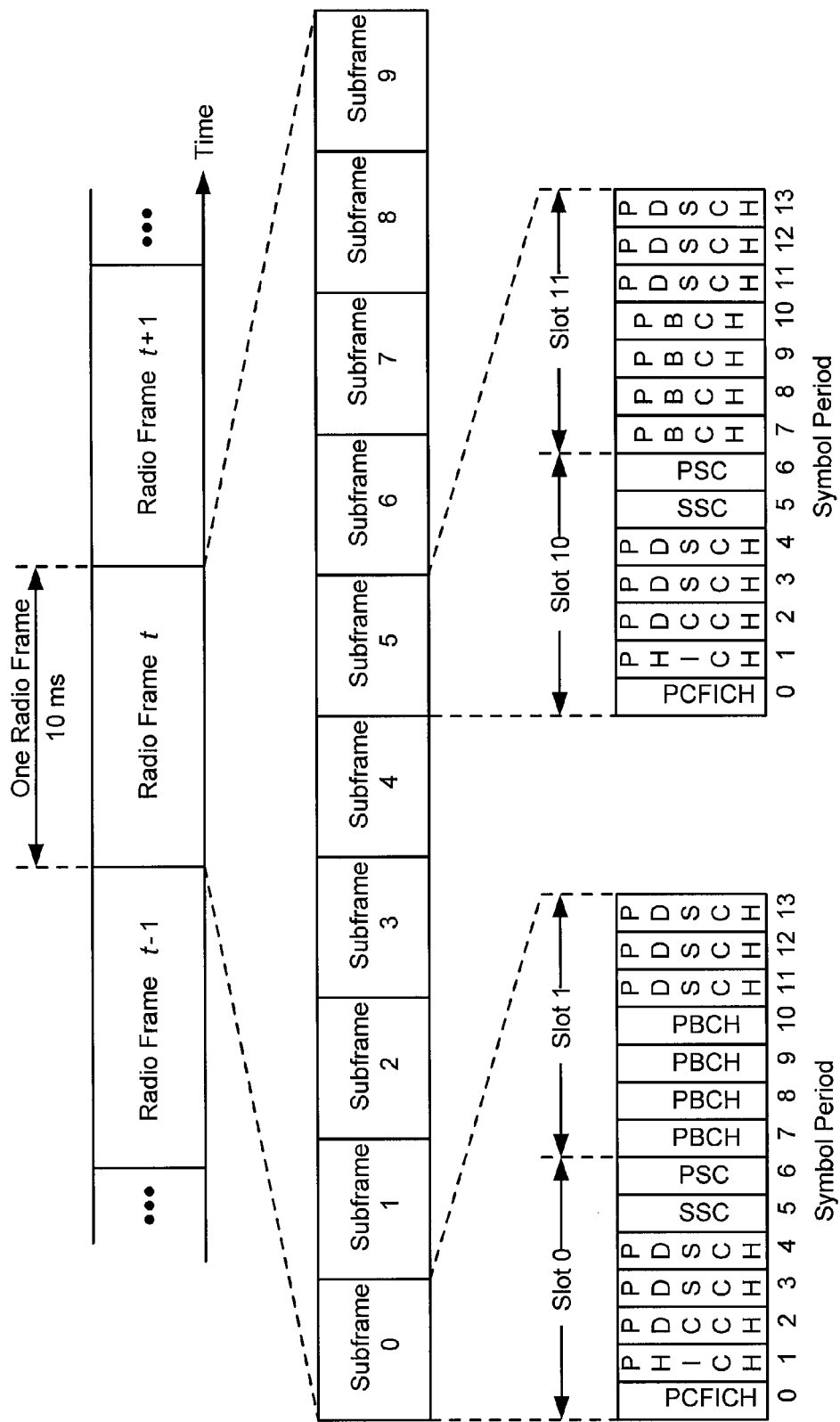
FIG. 2 is a block diagram conceptually illustrating an example of a down link frame structure in a telecommunications system.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
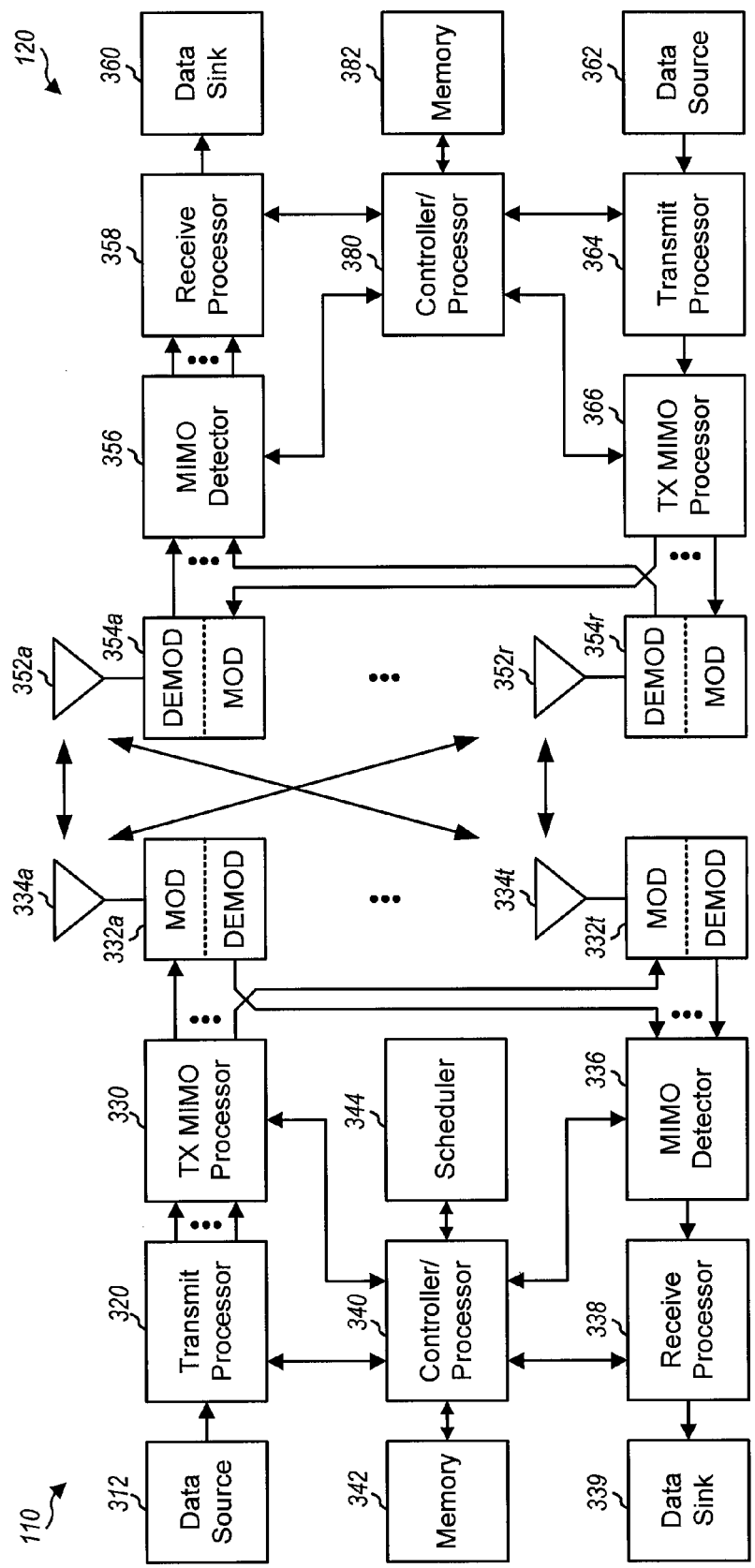
FIG. 3 is a block diagram conceptually illustrating a design of an eNodeB and a UE configured according to one aspect of the present disclosure.

FIG. 3 shows a block diagram of a design of an eNodeB 110 and a UE 120, which may be one of the eNodeBs and one of the UEs in FIG. 1. For a restricted association scenario, the eNodeB 110 may be the macro eNodeB 110c in FIG. 1, and the UE 120 may be the UE 120y. The eNodeB 110 may be equipped with antennas 334a through 334t, and the UE 120 may be equipped with antennas 352a through 352r.

At the eNodeB 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the eNodeB 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the eNodeB 110. At the eNodeB 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNodeB 110 and the UE 120, respectively. The processor 340 and/or other processors and modules at the eNodeB 110 may perform or direct the execution of various processes for the techniques described herein. The processor 380 and/or other processors and modules at the UE 120 may also perform or direct the execution of the functional blocks illustrated in FIGS. 5 and 6, and/or other processes for the techniques described herein. The memories 342 and 382 may store data and program codes for the eNodeB 110 and the UE 120, respectively. A scheduler 344 may schedule UEs for data transmission on the downlink and/or uplink.

As previously mentioned, the introduction of CoMP introduces a set of features that is generally unfriendly for interference suppression and interference cancellation. These complications stem, in part, from complexity involved in data region interference cancellation. This complexity stems from variations in data region interference cancellation as outlined below.

In data region cancellation, one or more attempts may be made to cancel intrinsic data and/or control transmissions from a cell, and this type of cancellation involves a lot of complexity due to the number of variations involved. For example, data transmissions may be unicast or broadcast, and the Radio Network Temporary Identifier (RNTI) associated with a particular transmission may, in theory, be of any value up to sixteen bits. Additionally, there exist a large number of transmission schemes (e.g., space-frequency block code (SFBC) based transmissions, ranks one to eight precoded transmissions, etc), and the reference signal for the data transmission may be based on a cell-specific reference signal (CRS) or a UE-specific reference signal (UE-RS). Also, the cell identity may be a physical cell identity or a virtual cell identity, and the rate matching scheme may depend on various factors. Further, modulation order, in terms of quadrature amplitude modulation (QAM), may vary greatly (e.g., 16QAM, 64QAM, 256QAM, etc.), power levels may be of any value, and there are three types of resource allocations for PDSCH. Moreover, the interference may involve the control channel or data channel (e.g., PDCCH, EPDCCH, or PDSCH), especially with distinct control region sizes across cells. Therefore, these variations in data region interference cancellation lead to complexity in data region interference cancellation, which in turn leads to CoMP related complications.

As mentioned above, CoMP is associated with a set of features that is generally unfriendly for interference suppression and/or interference cancellation. For example, there used to be a very limited number of options for UE-RS based scrambling for antenna ports 7-14, including a one-bit scrambling code identifier ($n_{scid}$) used for RS scrambling as part of the UE-specific assignment. However, CoMP introduces additional UE-specific information with transmission mode 10.

Transmission mode 10 can provide for MIMO using channel-state information reference signals (CSI-RS) and UE-RS, instead of CRS. The transmission mode may be used by an eNodeB to configure a UE to decode a PDSCH using a cell radio network temporary identifier (C-RNTI). The eNodeB can assign a radio network temporary identifier (RNTI) to the UE in a cell for precoding and decoding the PDCCH and PDSCH. Transmission mode 10 can be configured for MIMO transmitted on up to eight antennas. A rank (or layers) can refer to the number of antennas used for transmission (or reception). For example, a rank of four can refer to a MIMO transmission configured for four antennas. Using four layers can refer to a MIMO transmission configured for four antennas or four antenna ports. Transmission mode 10 can include a downlink control information (DCI) format 2D, which can include at least two bits for indicating PDSCH resource mapping and Quasi-Co-Location Indicator (PQI). The two bits for PQI can allow eNB to dynamically indicate one of up to four sets of PDSCH resource mapping and quasi-co-location parameters, including, e.g., a PDSCH starting symbol, number of CRS ports, CRS frequency shift, a non-zero-power CSI-RS configuration index, etc. Further, the cell identity for UE-RS scrambling is no longer necessarily a physical cell identity, and becomes UE-dependent. Accordingly, the PDSCH transmitted from a cell may not necessarily be the same as the physical cell identity, but may be a virtual cell identity. For example, consider a radio resource control configuration for two virtual cell identities, where $n_{scid}$ (rank 1 or 2) in DCI format 2D indicates which one to use:

$$c_{init} = \left(\left\lfloor \frac{n_s}{2} \right\rfloor + 1\right)(2n_{ID}^{n_{scid}} + 1)2^{16} + n_{scid}$$

$$\gg n_{ID}^{(0)} \ldots \text{first virtual cell } ID, n_{ID}^1 \ldots \text{second virtual cell } ID$$

It can be readily appreciated that, unless the number of virtual cell identities is limited, blind detection of ports 7-14 may be impractical.

Additional CoMP related complications also exist for interference suppression and/or interference cancellation. For example, rate matching for PDSCH typically depends on a starting symbol, CRS ports and frequency shift, CSI-RS configurations, and subframe type. Example subframe types include multi-broadcast single frequency network (MB-SFN), non-MBSFN, special subframes in TDD, whether CSI-RS is present, whether PSS/SSS/PBCH is present, etc.

Handling the starting symbol for PDSCH may be complicated in transmission mode 10. For example, the UE could previously generally assume that the PCFICH of a serving cell determines the starting symbol of PDSCH transmissions by the serving cell. However, with transmission mode 10, the starting symbol options increase. For example, with DCI format 2D, the starting symbol follows the 2-bit PQI indicating one of the four radio resource control (RRC) configurations. Additionally, with DCI format 1A in non-MBSFN subframes and PDCCH, the starting symbol follows PCFICH. Also, with DCI format 1A in non-MBSFN subframes and EPDCCH, the starting symbol follows that of the EPDCCH. Further, with DCI format 1A in MBSFN subframes (based on port 7), the starting symbol follows the first RRC configuration.

Handling the CRS ports and frequency shift may be additionally complicated in transmission mode 10. For example, the UE could previously assume that the CRS ports and frequency shift is based on the serving cell CRS. However, with transmission mode 10, the CRS ports and frequency shift options increase. For example, with DCI format 2D, the CRS ports and frequency shift follows the 2-bit PQI indicating one of the four RRC configurations. Additionally, with DCI format 1A in non-MBSFN subframes, regardless of PDCCH/EPDCCH, the CRS ports and frequency shift follows the serving cell. Also, with DCI format 1A in MBSFN subframes (based on port 7), the CRS ports and frequency shift follow the first RRC configuration in PQI.

Handling the CSI-RS is an additional complication in transmission mode 10. For example, the UE could previously assume the same physical cell identity used for CSI-RS, but the UE-specific configuration, especially with virtual cell identities as described above, prevents such an assumption. Also, the UE could previously assume that the PDSCH rate matches all CSI-RS configurations for the UE. However, with transmission mode 10, the PDSCH rate matches around all zero padding (ZP) CSI-RS configured for the UE, but the PDSCH rate matches around one out of three non-zero padding (NZP) configurations dynamically indicated in DCI 2D. Also, with DCI format 1A, in MBSFN subfames, the PDSCH rate matches the first state in RRC configuration, but with DCI format 1A in non-MBSFN subframes, the PDSCH rate matches the lowest CSI-RS index.

The CoMP related complications for interference suppression and/or interference cancellation further extend to collisions of control with data. For example, control regions may not be aligned among different cells. Also, the PDSCH starting symbol may not be aligned with PCFICH, as previously described. Further, EPDCCH may collide with PDSCH.

The CoMP related complications may particularly extend to collision of EPDCCH with PDSCH. For example, the EPDCCH starting symbol may be based on PCFICH or RRC configurations, depending on the transmission mode. As a result, for transmission modes 1-9, for either PCFICH or RRC, the UE may assume that the same starting symbol may be based on either PCFICH or RRC, but that the same starting symbol may be used for EPDCCH and PDSCH. However, for transmission mode 10, each of the two EPDCCH sets has its starting symbol derived from one RRC configuration for PDSCH. Additionally, the EPDCCH virtual cell identity is UE-specifically configured and EPDCCH dependent. As a result, similarly to PDSCH, EPDCCH virtual cell may be selected from a large set of values (e.g., up to 504 different values). As a result, it can be readily appreciated that, unless the number of virtual cell identities for EPDCCH is limited, blind detection of ports 107 to 110 for EPDCCH becomes impractical.

Figure 4:
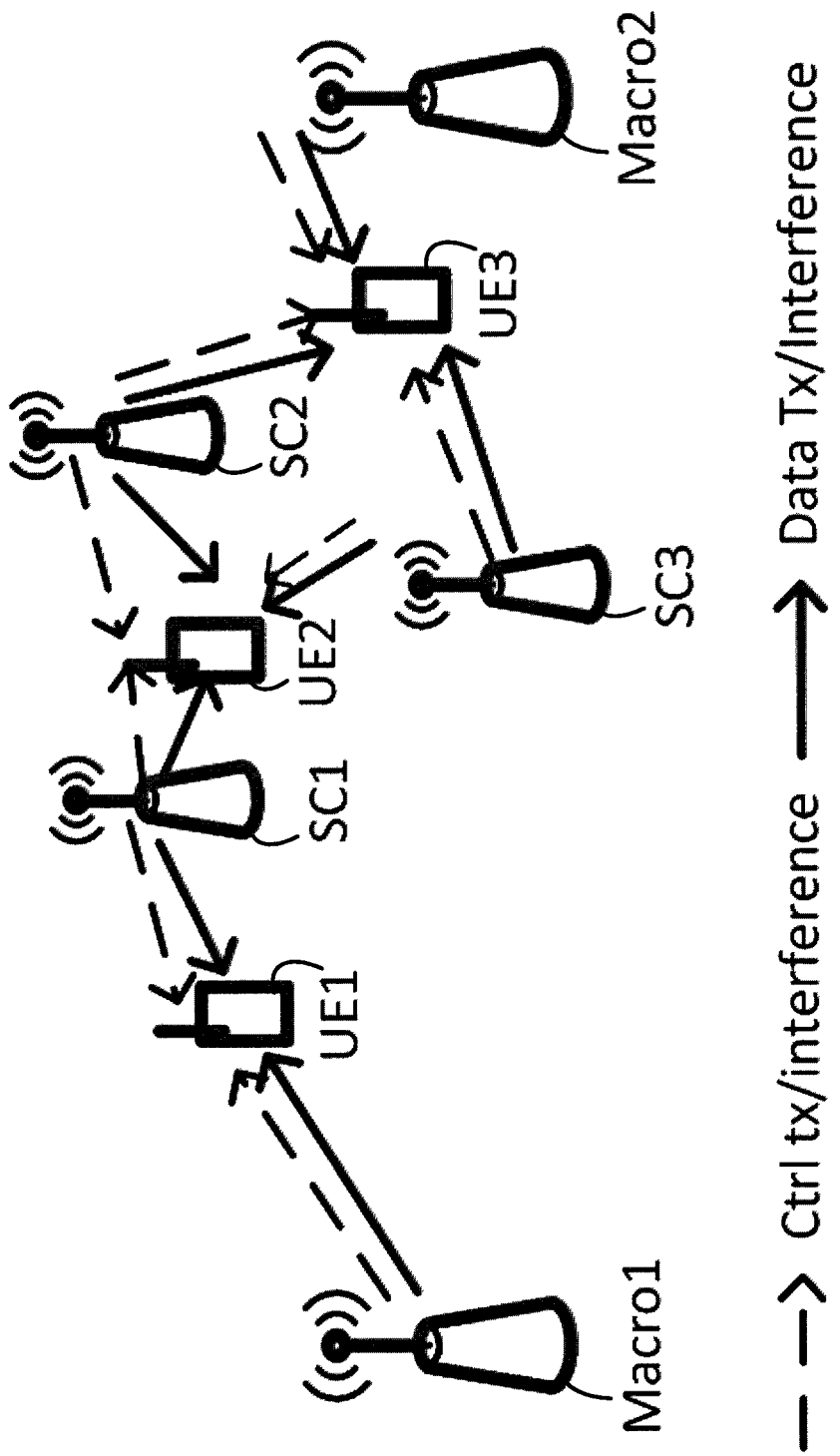
FIG. 4 is a block diagram conceptually illustrating virtual cell configuration according to one aspect of the present disclosure.

FIG. 4 is a block diagram conceptually illustrating virtual cell configuration. Therein, macro base stations, Macro 1 and Macro 2, may be deployed with three small cells, SC1, SC2, and SC3, and three UEs, UE1, UE2, and UE3. In accordance with an aspect of the present disclosure, an eNB may assist UEs with interference suppression and/or interference cancellation by configuring a set of virtual cells for a UE, and each virtual cell may be explicitly associated with one or more sets of physical parameters. For example, for a virtual cell X, a set of physical parameters, {P11, P12, P13} may be defined. In this example, the physical parameter P11 may represent two cell reference signal (CRS) ports with frequency shift equal to zero, the physical parameter P12 may represent that the EPDSCCH/PDSCH starts from symbol 3, and the physical parameter P13 may indicate a channel state information (CSI) configuration index with four ports. Additionally, a second set of physical parameters, {P21, P22, P23}, may be defined for the virtual cell X. In this example, the physical parameter P21 may represent two cell reference signal (CRS) ports with frequency shift equal to zero, the physical parameter P22 may indicate a starting symbol EPDCCH/PDSCH based on a PCFICH value associated with a PCI, and the physical parameter P23 may indicate a CSI configuration index with four ports. Other virtual cells Y and Z may have their own sets of physical parameters, {P31, P32, P33} and {P41, P42, P43}, respectively. For UE2, the eNB may configure the set of virtual cells in a list, table, or other data structure of the sets of parameters indexed by the virtual cell identities as demonstrated below in Table 1. Then, if two or more parameter sets are associated with one virtual cell, the UE2 may perform blind detection to determine which set is in use in a subframe.

TABLE 1

| UE indices | VCI | PCI |
| --- | --- | --- |
| UE2 | X | {P11, P12, P13} |
|  | X | {P21, P22, P23} |
|  | Y | {P31, P32, P33} |
|  | Z | {P41, P42, P43} |

In accordance with another aspect of the present disclosure, an eNB may assist a UE with interference suppression and/or interference cancellation by configuring a set of virtual cells for a UE, and each virtual cell may be implicitly associated with one or more sets of physical parameters. For example, in a CoMP Scenario 3 deployment, for each UE, each virtual cell may be mapped to one PCI, and all physical layer parameters may be derived based on the corresponding physical cell. It is envisioned that the eNB may generate this configuration of the set of virtual cells for one or multiple UEs as a list, table, or other data structure containing the PCIs indexed by the virtual cell identities as demonstrated below in Table 2.

TABLE 2

| UE indices | VCI | PCI |
| --- | --- | --- |
| UE1 | X | PCI of Macro1 |
|  | Y | PCI of SC1 |
| UE2 | X | PCI of SC1 |
|  | Y | PCI of SC2 |
|  | Z | PCI of SC3 |
| UE3 | X | PCI of SC2 |
|  | Y | PCI of SC3 |
|  | Z | PCI of Macro2 |

In another example involving a CoMP scenario 4 deployment, in a cluster, all virtual cells may be mapped to a same PCI for each UE. Across clusters, the mapping for each UE may be one-to-one, or many-to-one. It is envisioned that the eNB may generate this configuration of the set of virtual cells for one or multiple UEs as a list, table, or other data structure containing the PCIs indexed by the virtual cell identities as demonstrated below in Table 3.

TABLE 3

| UE indices | VCI | PCI |
|---|---|---|
| UE1 | X | PCI of Macro1 |
|  | Y | PCI of Macro1 |
| UE2 | X | PCI of Macro1 |
|  | Y | PCI of Macro1 |
|  | Z | PCI of Macro1 |
| UE3 | X | PCI of Macro1 |
|  | Y | PCI of Macro1 |
|  | Z | PCI of Macro2 |

In the above example of Table 3, UE1 and UE2 are in a cluster, and, thus, all of the virtual cells configured in the sets for UE 1 and UE2 may be mapped to the PCI of Macro 1. However, across clusters, UE3 may have a one-to-many mapping of the PCI for macro 1 to indices for virtual cells X and Y, and a one-to-one mapping of the PCI for Macro 2 to an index for virtual cell Z.

FIG. 5 is a functional block diagram illustrating example blocks of a process for performing wireless communications by a base station. The base station assists a UE in performing interference suppression and/or interference cancellation. As described in greater detail below, the base station assists the UE by configuring, at block 500, a set of virtual nodes for the UE, transmitting information to the UE, at block 502, about the set of virtual nodes, and, at block 504, operating for a same virtual cell according to a same set of parameters for some or all UEs. Processing may return from block 504 to an earlier point in the process, such as block 500.

At block 500, the base station may configure a set of one or more virtual cells for one or more UEs. As previously described, the one or more virtual cells of the set may be associated with one or more sets of parameters for the UEs to perform interference suppression and/or interference cancellation. In some aspects, block 500 may include configuring the set of virtual cells in a UE-specific fashion and/or a deployment scenario-specific fashion. For example, the base station may configure the set of virtual cells based on reference signal receive power reports from the UE. In other aspects, block 500 may include mapping from virtual cells to physical cells and/or a set of physical parameters on a one-to-one basis, a many-to-one basis, and/or a one-to-many basis. It is envisioned that the set of physical parameters may include a number of cell-specific reference signal ports, a cell-specific reference signal frequency shift, and/or a starting symbol for EPDCCH/PDSCH. It is also envisioned that the set of physical parameters may include one or more channel state information reference signal configurations, a carrier type, such as legacy or non-legacy carrier type, and/or one or more demodulation reference signal patterns. In additional aspects, block 500 may include limiting a number of the virtual cells configured for a UE to a degree sufficient to permit blind detection of antenna ports 7-14.

In further aspects, block 500 may additionally or separately include specifying a default behavior for a UE to perform interference suppression and/or interference cancellation at least for unconfigured cells. For example, a UE may be specified or indicated that it should perform interference suppression and/or interference cancellation based a physical cell identity and associated physical parameters. A set of neighboring cells with physical cell identities may be detected by the UE and may be taken into account for interference suppression and/or interference cancellation, separately or in addition to a set of configuration virtual cells, if any. As an example, a UE may detect two PCIs (PCI0 and PCI1) in its neighbor, and is further configured with three virtual cells (VC0, VC1, VC2). The UE may perform interference suppression and/or interference cancellation based on {PCI0, PCI1, VC0, VC1, VC2} and/or the serving cell (for intra-cell single-user and/or multi-user MIMO related interference). Alternatively or additionally, a UE configured with CoMP may be specified or indicated that it should perform interference suppression and/or interference cancellation based on a set of configurations for PDSCH and/or EPDCCH rate matching and/or quasi-co-location operations. In these aspects, it is envisioned that the UE may be specified or indicated that it should blindly detect whether or not the physical parameters associated with the physical cell identity are valid, and/or perform consistency check between at least of one detected PCI and at least one configured virtual cell. In these aspects, a UE may determine to perform some or all of these operations as an implementation choice instead of based on specification or an indication.

In other aspects, block 500 may include configuring one set of virtual cells for use with a control channel, a channel state information reference signal channel, and a data channel. Alternatively, different sets of virtual cells may be configured for different channels. In additional aspects, block 500 may include configuring the set of virtual cells to be semi-static or configuring the set of virtual cells dynamically. In the case of dynamic configuration, it is envisioned that the configuration may be indicated in a DCI at block 502. In further aspects, block 500 may include associating a physical cell with more than one of the virtual cells, and/or associating a virtual cell with two or more sets of parameters. It is envisioned that, at block 500, the sets of virtual cells may be configured for both legacy and non-legacy carrier types. It is envisioned that the configuration may be conveyed to a UE via a broadcast message or a unicast message.

In other aspects, block 500 may include mapping a virtual cell to a physical cell identity of a same serving cell to handle intra-cell interference suppression (e.g., due to single-user MIMO and/or multiple-user MIMO operation) and/or interference cancellation. It is additionally envisioned that, at block 500, CoMP for a UE may be configured jointly with or separately from configuring the set of virtual cells. It is also envisioned that, at block 500, a number of the parameters and/or a set of parameters may be the same or different for different ones of the virtual cells of the set of virtual cells. It is further envisioned that, at block 500, a virtual cell may configured for application to all subframes, a subset of the subframes, an entire bandwidth, or a fraction of the entire bandwidth. It is further envisioned that instead of using a virtual cell as an index for a set of configuration parameters, the configuration can be based on any parameter as indexing. The configuration can be without any indexing as well. As an example, the configuration may simply consist of one or more sets of parameters, each set comprising of one or more physical and/or virtual cell identities. It is further envisioned that the set of parameters associated with a virtual cell configured for a UE may represent only a subset of possible operations associated with the virtual cell. That is, some other parameters associated with the virtual cell may not be part of the configuration and indicated to the UE. A UE may have to blindly detect and/or determine one or more of these unconfigured parameters (e.g., traffic-to-pilot ratio of a data channel) for interference suppression and/or interference cancellation.

FIG. 6 is a block diagram illustrating example blocks of a process for performing wireless communications by a UE. At bock 600, information is received from a node regarding, for a UE, a set of one or more virtual cells. One or more of the virtual cells may be associated with a set of parameters for the UE to perform interference suppression and/or interference cancellation. One or more of the virtual cells may be mapped to one or more physical cell identities. It is envisioned that the information may be received from a base station as indicated in a DCI, or a message/signaling/configuration. Processing may proceed from block 600 to block 602.

At block 602, the UE may communicate with the node. The communication may be based at least in part on at least one virtual cell among the one or more of the virtual cells and its associated set of parameters. Block 602 may be comprised of several sub-blocks.

At block 602A, the UE may determine whether a current virtual cell is configured as part of the set. For example, sub-block 602A may include referencing a table, list, or other indexed data structure in the set of virtual cells is configured, and attempting to locate an index matching the current virtual cell identity. Upon failure to locate the index, processing may proceed from sub-block 602A to sub-block 602B. Alternatively, upon locating the index, processing may proceed from sub-block 602A to block 602C.

At block 602B, the UE may perform, for a current virtual cell determined not to be configured as part of the set of one or more virtual cells, interference suppression and/or interference cancellation according to a default behavior. For example, it is envisioned that the default behavior may include performing interference suppression and/or interference cancellation based on a physical cell identity and the associated physical parameters, detected by the UE. Additionally, it is envisioned that the default behavior may include blindly detecting, by the UE, whether or not the physical parameters associated with the physical cell identity are valid. Alternatively, it is envisioned that the default behavior may include performing, by a UE configured with coordinated multipoint, interference suppression and/or interference cancellation based at least on a set of configurations for PDSCH and/or EPDCCH rate matching and/or quasi-co-location operations. It is further envisioned that the default behavior may be specified in the set of virtual cells, received with the information regarding the set of virtual cells, and/or specified by a standard as a default behavior to be employed at all times, or when no other default behavior is specified by the information. Processing may return from block 602B to an earlier point in the processing, such as block 600

At block 602C, the UE may obtain the set of parameters for the current cell from the set of virtual cells. For example, it is envisioned that the set of parameters may be retrieved from the table, list, or other indexed data structure at a location indexed by the current virtual cell identity. As described above, the parameters may be explicit and/or implicit. Processing may proceed from block 602C to block 602D.

At block 602D, the UE may determine whether the current virtual cell has one complete set of associated physical parameters. If it is determined that there is one complete set of associated physical and/or upper layer parameters, then processing may proceed from block 602D to block 602F. However, if it is determined that there is more than one set of physical and/or upper layer parameters, of that only a PCI and/or partial set of parameters is provided, then processing may proceed from block 602D to block 602E.

At block 602E, the UE may obtain, in response to determining that the current virtual cell does not have one complete set of associated physical and/or upper layer parameters, correct physical and/or upper layer parameters and/or additional physical and/or upper layer parameters. It is envisioned that obtaining the correct physical and/or upper layer parameters or additional physical and/or upper layer parameters at block 602E may include performing blind detection to determine which set of parameters is correct, and/or to obtain the additional parameters. Processing may proceed from block 602E to block 602F.

At block 602F, the UE may perform interference suppression and/or interference cancellation according to the set of parameters obtained at block 602C and/or block 602E. It is envisioned that, at block 602F, the UE may apply the set of parameters to all subframes, a subset of the subframes, an entire bandwidth, and/or a fraction of the entire bandwidth. Processing may proceed form block 602F to an earlier point in the processing, such as block 600.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for performing wireless communication, the method comprising:
   configuring a set of one or more virtual cells for one or more user equipments (UEs), wherein one or more virtual cells of the set is associated with at least one set of parameters, wherein configuring the set of virtual cells includes mapping from virtual cells to a set of physical parameters, and wherein configuring the set of virtual cells includes specifying a default behavior for a user equipment (UE) to perform at least one of interference suppression or interference cancellation for unconfigured cells;
   transmitting information, to the UEs, regarding the set of the one or more virtual cells; and
   operating, for a same virtual cell of the set of one or more virtual cells, according to a same set of parameters for some or all of the one or more UEs.

2. The method of claim 1, wherein the interference is caused by at least one of a control transmission or data transmission by the at least one virtual cell among the set of one or more virtual cells.

3. The method of claim 1, wherein the at least one of interference suppression or interference cancellation is performed for at least one of a control transmission or a data transmission by a cell.

4. The method of claim 1, wherein configuring the set of virtual cells includes configuring the set of virtual cells in at least one of a user equipment (UE) specific fashion or a cell-specific fashion.

5. The method of claim 4, wherein configuring the set of virtual cells in the UE specific fashion includes configuring the set of virtual cells based on reference signal receive power reports from the UE.

6. The method of claim 1, wherein mapping from virtual cells to the set of physical parameters is performed on at least one of a one-to-one basis, a many-to-one basis, or a one-to-many basis.

7. The method of claim 6, wherein the set of physical parameters includes at least two of:
   the cell-specific reference signal frequency shift;
   the starting symbol for at least one of enhanced physical downlink control channel or physical downlink shared channel;
   the one or more channel state information reference signal configurations;
   the carrier type; or
   the one or more demodulation reference signal patterns.

8. The method of claim 1, wherein configuring the set of virtual cells includes limiting a number of the virtual cells configured for a user equipment (UE) to a degree sufficient to permit blind detection of antenna ports 7-14.

9. The method of claim 1, wherein specifying the default behavior includes at least one of:
   specifying that the UE should perform at least one of interference suppression or interference cancellation based at least on a physical cell identity and physical parameters associated therewith; or
   specifying that the UE configured with coordinated multipoint should perform at least one of interference suppression or interference cancellation based at least on a set of configurations for PDSCH and/or EPDCCH rate matching and/or quasi-co-location operations.

10. The method of claim 9, wherein specifying that the UE should perform at least one of interference suppression or interference cancellation based at least on physical cell identity includes specifying that the UE should blindly detect whether or not the physical parameters associated with the physical cell identity are valid.

11. The method of claim 1, wherein configuring the set of virtual cells includes configuring one set of virtual cells for use with a control channel, a channel state information reference signal channel, and a data channel.

12. The method of claim 1, wherein configuring the set of virtual cells includes at least one of:
configuring the set of virtual cells to be semi-static; or
configuring the set of virtual cells dynamically.

13. The method of claim 12, wherein transmitting information regarding the set of the one or more virtual cells includes dynamically signaling the information in downlink control information.

14. The method of claim 1, wherein configuring the set of virtual cells includes associating a physical cell with more than one of the virtual cells.

15. The method of claim 1, wherein configuring the set of virtual cells includes configuring the set of virtual cells for both legacy and non-legacy carrier types.

16. The method of claim 1, wherein configuring the set of virtual cells includes mapping a virtual cell to a physical cell identity of a same serving cell to handle intra-cell at least one of interference suppression or interference cancellation.

17. The method of claim 1, further including:
configuring coordinated multipoint for a user equipment (UE) at least one of jointly with or separately from configuring the set of virtual cells.

18. The method of claim 1, wherein a number of parameters of the at least one set of parameters is at least one of the same or different for different ones of the virtual cells of the set of virtual cells.

19. The method of claim 1, wherein the at least one virtual cell of the set of one or more virtual cells is configured for application to at least one of all subframes or a subset of the subframes.

20. The method of claim 1, wherein the at least one virtual cell of the set of one or more virtual cells is configured for application to at least one of an entire bandwidth or a fraction of the entire bandwidth.

21. A method for performing wireless communications, the method comprising:
receiving, from a node, information, for a user equipment (UE), regarding a set of one or more virtual cells, wherein one or more of the virtual cells is associated with a set of parameters, and the set of one or more virtual cells includes at least one virtual cell that is mapped to a set of physical parameters;
communicating with the node, wherein the communication is based at least in part on at least one virtual cell among the one or more of the virtual cells and its associated set of parameters, including:
performing, in response to determining that the at least one virtual cell is configured as part of the set of one or more virtual cells, at least one of interference suppression or interference cancellation according to the associated set of parameters of the at least one virtual cell; and
performing, in response to determining that another virtual cell is not configured as part of the set of one or more virtual cells, at least one of interference suppression or interference cancellation according to a default behavior.

22. The method of claim 21, wherein the at least one of interference suppression or interference cancellation is performed for at least one of a control transmission or a data transmission by a cell.

23. The method of claim 21, wherein the default behavior includes performing at least one of interference suppression or interference cancellation based at least on a physical cell identity and physical parameters associated therewith.

24. The method of claim 23, wherein the default behavior includes blindly detecting whether or not the physical parameters associated with the physical cell identity are valid.

25. The method of claim 21, wherein the default behavior includes performing, by a UE configured with coordinated multipoint, at least one of interference suppression or interference cancellation based on at least one of:
a set of configurations for at least one of PDSCH or EPDCCH rate matching; or
quasi-co-location operations.

26. The method of claim 21, further including:
determining whether a current virtual cell has one complete set of parameters associated therewith; and
obtaining, in response to determining that the current virtual cell does not have one complete set of parameters associated therewith, at least one additional parameter,
wherein obtaining the at least one additional parameter includes performing blind detection.

27. The method of claim 21, wherein the at least one virtual cell is mapped to the set of physical parameters on at least one of a one-to-one basis, a many-to-one basis, or a one-to-many basis.

28. The method of claim 27, wherein the set of physical parameters includes at least two of:
the starting symbol for at least one of enhanced physical downlink control channel or physical downlink shared channel;
the one or more channel state information reference signal configurations;
the carrier type; or
the one or more demodulation reference signal patterns.

29. The method of claim 21, wherein the at least one virtual cell of the set of one or more virtual cells is configured for application to at least one of all subframes or a subset of the subframes.

30. The method of claim 21, wherein the at least one virtual cell of the set of one or more virtual cells is configured for application to at least one of an entire bandwidth or a fraction of the entire bandwidth.

31. An apparatus for performing wireless communication, the apparatus comprising:
means for configuring a set of one or more virtual cells for one or more user equipments (UEs), wherein one or more virtual cells of the set is associated with at least one set of parameters, wherein configuring the set of virtual cells includes mapping from virtual cells to a set of physical parameters, and wherein configuring the set of virtual cells includes specifying a default behavior for a user equipment (UE) to perform at least one of interference suppression or interference cancellation for unconfigured cells;
means for transmitting information, to the UEs, regarding the set of the one or more virtual cells; and
means for operating, for a same virtual cell of the set of one or more virtual cells, according to a same set of parameters for some or all of the one or more UEs.

32. The apparatus of claim 31, wherein the interference is caused by at least one of a control transmission or data transmission by at least one virtual cell among the set of one or more virtual cells.

33. The apparatus of claim 31, wherein the at least one of interference suppression or interference cancellation is performed for at least one of a control transmission or a data transmission by a cell.

34. The apparatus of claim 31, wherein the means for configuring the set of virtual cells includes means for configuring the set of virtual cells in at least one of a user equipment (UE) specific fashion or a cell-specific fashion.

35. The apparatus of claim 34, wherein the means for configuring the set of virtual cells in the UE specific fashion includes means for configuring the set of virtual cells based on reference signal receive power reports from the UE.

36. The apparatus of claim 31, wherein the means for mapping from virtual cells to the set of physical parameters performs mapping on at least one of a one-to-one basis, a many-to-one basis, or a one-to-many basis.

37. The apparatus of claim 36, wherein the set of physical parameters includes at least two of:
the cell-specific reference signal frequency shift;
the starting symbol for at least one of enhanced physical downlink control channel or physical downlink shared channel;
the one or more channel state information reference signal configurations;
the carrier type; or
the one or more demodulation reference signal patterns.

38. The apparatus of claim 31, wherein the means for configuring the set of virtual cells includes means for limiting a number of the virtual cells configured for a user equipment (UE) to a degree sufficient to permit blind detection of antenna ports 7-14.

39. The apparatus of claim 31, wherein the means for specifying the default behavior includes at least one of:
means for specifying that the UE should perform at least one of interference suppression or interference cancellation based at least on a physical cell identity and physical parameters associated therewith; or
means for specifying that the UE configured with coordinated multipoint should perform at least one of interference suppression or interference cancellation based at least on a set of configurations for PDSCH and/or EPDCCH rate matching and/or quasi-co-location operations.

40. The apparatus of claim 39, wherein the means for specifying that the UE should perform at least one of interference suppression or interference cancellation based at least on physical cell identity includes means for specifying that the UE should blindly detect whether or not the physical parameters associated with the physical cell identity are valid.

41. The apparatus of claim 31, wherein the means for configuring the set of virtual cells includes means for configuring one set of virtual cells for use with a control channel, a channel state information reference signal channel, and a data channel.

42. The apparatus of claim 31, wherein the means for configuring the set of virtual cells includes at least one of:
means for configuring the set of virtual cells to be semi-static; or
means for configuring the set of virtual cells dynamically.

43. The apparatus of claim 42, wherein the means for transmitting information regarding the set of the one or more virtual cells includes means for dynamically signaling the information in downlink control information.

44. The apparatus of claim 31, wherein the means for configuring the set of virtual cells includes means for associating a physical cell with more than one of the virtual cells.

45. The apparatus of claim 31, wherein the means for configuring the set of virtual cells includes means for configuring the set of virtual cells for both legacy and non-legacy carrier types.

46. The apparatus of claim 31, wherein the means for configuring the set of virtual cells includes means for mapping a virtual cell to a physical cell identity of a same serving cell to handle intra-cell at least one of interference suppression or interference cancellation.

47. The apparatus of claim 31, further including:
means for configuring coordinated multipoint for a user equipment (UE) at least one of jointly with or separately from configuring the set of virtual cells.

48. The apparatus of claim 31, wherein a number of parameters of the at least one set of parameters is at least one of the same or different for different ones of the virtual cells of the set of virtual cells.

49. The apparatus of claim 31, wherein the at least one virtual cell of the set of one or more virtual cells is configured for application to at least one of all subframes or a subset of the subframes.

50. The apparatus of claim 31, wherein the at least one virtual cell of the set of one or more virtual cells is configured for application to at least one of an entire bandwidth or a fraction of the entire bandwidth.

51. An apparatus for performing wireless communications, the apparatus comprising:
means for receiving, from a node, information, for a user equipment (UE), regarding a set of one or more virtual cells, wherein one or more of the virtual cells is associated with a set of parameters, and the set of one or more virtual cells includes at least one virtual cell that is mapped to a set of physical parameters; and
means for communicating with the node, wherein the communication is based at least in part on at least one virtual cell among the one or more of the virtual cells and its associated set of parameters, including:
performing, in response to determining that the at least one virtual cell is configured as part of the set of one or more virtual cells, at least one of interference suppression or interference cancellation according to the associated set of parameters of the at least one virtual cell: and
performing, in response to determining that another virtual cell is not configured as part of the set of one or more virtual cells, at least one of interference suppression or interference cancellation according to a default behavior.

52. The apparatus of claim 51, wherein the at least one of interference suppression or interference cancellation is performed for at least one of a control transmission or a data transmission by a cell.

53. The apparatus of claim 51, wherein the default behavior includes performing at least one of interference suppression or interference cancellation based at least on a physical cell identity and physical parameters associated therewith.

54. The apparatus of claim 53, wherein the default behavior includes blindly detecting whether or not the physical parameters associated with the physical cell identity are valid.

55. The apparatus of claim 51, wherein the default behavior includes performing, by a UE configured with coordinated multipoint, at least one of interference suppression or interference cancellation based on at least one of:
   a set of configurations for at least one of PDSCH or EPDCCH rate matching; or
   quasi-co-location operations.

56. The apparatus of claim 51, further including:
   means for determining whether a current virtual cell has one complete set of parameters associated therewith; and
   means for obtaining, in response to determining that the current virtual cell does not have one complete set of parameters associated therewith, at least one additional parameter,
   wherein the means for obtaining the at least one additional parameter includes means for performing blind detection.

57. The apparatus of claim 51, wherein the at least one virtual cell is mapped to the set of physical parameters on at least one of a one-to-one basis, a many-to-one basis, or a one-to-many basis.

58. The apparatus of claim 57, wherein the set of physical parameters includes at least two of:
   the cell-specific reference signal frequency shift;
   the starting symbol for at least one of enhanced physical downlink control channel or physical downlink shared channel;
   the one or more channel state information reference signal configurations;
   the carrier type; or
   the one or more demodulation reference signal patterns.

59. The apparatus of claim 51, wherein the at least one virtual cell of the set of one or more virtual cells is configured for application to at least one of all subframes or a subset of the subframes.

60. The apparatus of claim 51, wherein the at least one virtual cell of the set of one or more virtual cells is configured for application to at least one of an entire bandwidth or a fraction of the entire bandwidth.

61. A computer program product comprising:
   a non-transitory computer-readable medium comprising:
      code for causing a computer to configure a set of one or more virtual cells for one or more user equipments (UEs), wherein one or more virtual cells of the set is associated with at least one set of parameters, wherein configuring the set of virtual cells includes mapping from virtual cells to a set of physical parameters, and wherein configuring the set of virtual cells includes specifying a default behavior for a user equipment (UE) to perform at least one of interference suppression or interference cancellation for unconfigured cells;
      code for causing the computer to transmit information, to the UEs, regarding the set of the one or more virtual cells; and
      code for causing the computer to operate, for a same virtual cell of the set of one or more virtual cells, according to a same set of parameters for some or all of the one or more UEs.

62. A computer program product comprising:
   a non-transitory computer-readable medium comprising:
      code for causing a computer to receive, from a node, information, for a user equipment (UE), regarding a set of one or more virtual cells, wherein one or more of the virtual cells is associated with a set of parameters, and the set of one or more virtual cells includes at least one virtual cell that is mapped to a set of physical; and
      code for causing the a computer to communicate with the node, wherein the communication is based at least in part on at least one virtual cell among the one or more of the virtual cells and its associated set of parameters, including:
         code for causing a computer to perform, in response to determining that the at least one virtual cell is configured as part of the set of one or more virtual cells, at least one of interference suppression or interference cancellation according to the associated set of parameters of the at least one virtual cell; and
         code for causing a computer to perform, in response to determining that another virtual cell is not configured as part of the set of one or more virtual cells, at least one of interference suppression or interference cancellation according to a default behavior.

63. A base station to perform wireless communications, said base station comprising:
   at least one processor; and
   a memory coupled to said at least one processor,
   wherein the at least one processor is configured to:
      configure a set of one or more virtual cells for one or more user equipments (UEs), wherein one or more virtual cells of the set is associated with at least one set of parameters, wherein configuring the set of virtual cells includes mapping from virtual cells to a set of physical parameters, and wherein configuring the set of virtual cells includes specifying a default behavior for a user equipment (UE) to perform at least one of interference suppression or interference cancellation for unconfigured cells;
      transmit information, to the UEs, regarding the set of the one or more virtual cells; and
      operate, for a same virtual cell of the set of one or more virtual cells, according to a same set of parameters for some or all of the one or more UEs.

64. A user equipment to perform wireless communications, said user equipment comprising:
   at least one processor; and
   a memory coupled to said at least one processor,
   wherein the at least one processor is configured to:
      receive, from a node, information, for said user equipment (UE), regarding a set of one or more virtual cells, wherein one or more of the virtual cells is associated with a set of parameters, and the set of one or more virtual cells includes at least one virtual cell that is mapped to a set of physical parameters; and
      communicate with the node, wherein the communication is based at least in part on at least one virtual cell among the one or more of the virtual cells and its associated set of parameter, including:
         perform, in response to determining that the at least one virtual cell is configured as part of the set of one or more virtual cells, at least one of interference suppression or interference cancellation according to the associated set of parameters of the at least one virtual cell; and
         perform, in response to determining that another virtual cell is not configured as part of the set of one or more virtual cells, at least one of interference suppression or interference cancellation according to a default behaviors.

* * * * *